US007286596B2

United States Patent
Sawada et al.

(10) Patent No.: US 7,286,596 B2
(45) Date of Patent: Oct. 23, 2007

(54) TRAINING METHOD FOR RECORDING MEDIUM REPRODUCTION EQUALIZER AND RECORDING MEDIUM REPRODUCTION APPARATUS

(75) Inventors: Masaru Sawada, Kawasaki (JP); Motomu Takatsu, Kawasaki (JP); Takao Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 721 days.

(21) Appl. No.: 10/722,915

(22) Filed: Nov. 26, 2003

(65) Prior Publication Data

US 2005/0099907 A1    May 12, 2005

(30) Foreign Application Priority Data

Nov. 29, 2002 (JP) .............. 2002-348790

(51) Int. Cl.
     *H03H 7/30*      (2006.01)
     *H03K 5/159*      (2006.01)

(52) U.S. Cl. .............. 375/231; 375/232; 375/229; 708/323

(58) Field of Classification Search ....... 375/229, 375/231, 232, 350, 260, 348; 360/65; 708/323
See application file for complete search history.

(56) References Cited

U.S. PATENT DOCUMENTS

| | | | |
|---|---|---|---|
| 5,309,484 A | | 5/1994 | McLane et al. |
| 5,760,984 A | | 6/1998 | Spurbeck et al. |
| 5,999,355 A | * | 12/1999 | Behrens et al. ............... 360/65 |
| 6,381,085 B1 | | 4/2002 | Du et al. |
| 2004/0028159 A1 | * | 2/2004 | Abdelilah et al. .......... 375/350 |
| 2004/0047409 A1 | * | 3/2004 | Lee et al. .................... 375/232 |
| 2004/0071206 A1 | * | 4/2004 | Takatsu ....................... 375/232 |
| 2004/0091037 A1 | * | 5/2004 | Balasubramonian et al. ........................... 375/232 |
| 2004/0233981 A1 | * | 11/2004 | Porter et al. ................. 375/229 |
| 2005/0169361 A1 | * | 8/2005 | Yousef et al. ............... 375/233 |

* cited by examiner

*Primary Examiner*—Mohammed Ghayour
*Assistant Examiner*—Qutub Ghulamali
(74) *Attorney, Agent, or Firm*—Greer, Burns & Crain, Ltd.

(57) ABSTRACT

In a training operation for optimizing a multiplication coefficient for each tap of an FIR equalizer equalizing a read signal read from a recording medium, as a restricted coefficient updating vector applied for updating the multiplication coefficient for each tap of an FIR filter, a vector is utilized which is obtained by projecting, onto a plane perpendicular to a predetermined restricting conditioning vector, a coefficient updating vector determined based on an equalizer error between the output of the FIR equalizer and a reproduction output determined therefrom and a delayed input value for each tap of the FIR equalizer. As the restricting conditioning vector, a vector is utilized which is a difference between a subsequent coefficient vector obtained in the same condition immediately subsequent to and an antecedent coefficient vector obtained in the same condition immediately antecedent to a reference coefficient comprising the multiplication coefficient for the equalizer obtained upon calculating the equalizer error.

14 Claims, 17 Drawing Sheets

TRAINING METHOD FOR RECORDING MEDIUM REPRODUCTION EQUALIZER AND RECORDING MEDIUM REPRODUCTION APPARATUS

BACKGROUND OF THE INVENTION

1. Field of the Invention

The present invention relates to a method of training a recording medium reproduction equalizer and to a recording medium reproduction apparatus, and, in particular, to a recording medium reproduction apparatus including a read channel LSI or so applied for reading data recorded in a magnetic recording medium such as a hard disk or so, and to a method of training a so-called adaptive equalizer, so as to obtain equalization characteristics which are optimum upon reproducing digital data from an analog waveform read from the recording medium via a reproduction head in the above-mentioned recording medium reproduction apparatus.

2. Description of the Related Art

In case of decoding digital data from an analog signal read out from a recording medium in which the digital data is magnetically recorded, processing is performed such as to equalize the thus-obtained read signal into an equalization target according to a PR (partial response) technology as disclosed in U.S. Pat. No. 5,999,355 to Behrens et al. An equalizer applied for performing the above-mentioned equalization processing equalizes the read signal into the target PR characteristic through an adjustment control operation for predetermined coefficients of the equalizer performed according to a frequency characteristic of the read signal obtained via the reproduction.

As a method of adjusting the coefficient of the equalizer so as to adapt to the characteristic of the read signal each time with a reproduction apparatus such as a read channel LSI having the above-mentioned function (simply referred to as 'training', hereinafter), a so-called LMS (least mean square) algorism may be applied. However, in this method, in case a signal having a periodicity such as that from a preamble of a recording medium or so is processed, a result of the above-mentioned training may not converge into an optimum value but may rather diverge.

In order to avoid such a problematic situation, the training operation of the equalizer may be made ineffective for such a portion having a periodic pattern such as the preamble provided at the top of sectors in a hard disk which is a magnetic recording medium. Thereby, for the preamble, signal processing is performed only by means of an AGC (automatic gain control) loop by which the gain of the read signal is maintained at a constant value and a TR (timing recovery) loop by which a read timing in synchronization with the read signal is ensured.

Alternatively, as a method of performing the above-mentioned equalizer training operation at any time including a timing of handling a reproduction signal from the preamble, a method may be considered in which change in the coefficients occurring due to the training is restricted in a predetermined manner for the preamble. That is, according to this method, a restricting conditioning by which the equalization characteristics (gain and phase) are fixed is applied to the LMS method for a frequency of a sinusoidal wave of the read signal from the preamble. In this method, a variation vector of the coefficient vector is restricted onto a plane perpendicular to a signal vector (equalizer tap length) which is used as the restricting conditioning. Thereby, the frequency response to the signal vector for restricting conditioning is maintained at a fixed value. In other words, according to this method, the equalizer training is not substantially performed for the preamble.

SUMMARY OF THE INVENTION

As described above, in a recording medium reproduction apparatus made of a read channel LSI for a hard disk or so, the above-mentioned AGC loop and TR loop respectively influence the equalizer training loop and vise versa. Thereby, the total loop control behavior may be made unstable. For the purpose of overcoming this problem, a method of reducing the gain of the other two loops (AGC and TR) than the gain of the equalizer training gain, a method of fixing large coefficients among the coefficients of the equalizer are prevented from being adjusted by the training but are fixed so as to stabilize the behavior of the whole loop control, or so, have been tried.

However, in the above-mentioned method in which a predetermined restricting conditioning is applied while the training is continued, errors which cannot be corrected may accumulate gradually in case many sectors are read successively from the recording medium.

If the above-mentioned method of purposefully abandoning continuous training by fixing the frequency characteristics responsive to the signal from the preamble in order to avoid such error accumulation, it may not be possible to achieve such a control operation as that by which a temperature change, a change occurring due to aging and so forth in the disk recording medium can be properly followed up in a real-time manner, whereby data reproduction error rate may increase.

The present invention has been devised so as to overcome the above-mentioned problem, and, an object of the present invention is to provide a recording medium reproduction apparatus and an equalizer coefficient training method in which the gain and phase delay characteristic of the equalizer are restricted in a predetermined manner, and thereby mutual influencing between both the AGC and TR loop and the equalizer coefficient training loop is well controlled, so as to enable continuous training, thereby enabling real-time following up of the equalizer to environmental variation or so In order to achieve the above-mentioned object, according to the present invention, in a training operation for adaptively optimizing the equalization characteristics of an FIR equalizer by means of appropriately adjusting the coefficients thereof, a coefficient updating vector applied for updating each tap coefficient is restricted by an amount according to an equalization error output which is a difference between the output of the FIR equalizer and a decoded output determined therefrom as well as the input value for the relevant tap of the FIR filter. For this purpose, the coefficient updating vector is projected onto a plane perpendicular to a predetermined restricting conditioning vector, and, thereby, a new coefficient updating vector actually applied for updating the FIR filter is obtained.

At this time, in order to achieve a training operation in a condition in which the gain of the FIR equalizer is fixed, the coefficient vector obtained upon calculation of the above-mentioned equalizer error output may be applied as the above-mentioned predetermined restricting conditioning vector.

Alternatively, in order to achieve a training operation in a condition in which the phase of the FIR equalizer is fixed, a vector which is a difference between the coefficient vector obtained upon calculation of the above-mentioned equalizer error output and the immediately subsequent coefficient vector obtained in the same condition (approximately, which is obtained from shifting each tap value of the FIR filter toward the higher order side by one each, and inserting 0 at the lowest order tap value) may be applied as the above-mentioned predetermined restricting conditioning vector.

Further alternatively, in order to achieve a training operation in a condition in which the phase of the FIR equalizer is fixed, a vector which is a difference between the immediately subsequent coefficient vector (approximately, obtained from shifting each tap value of the FIR filter toward the higher order side by one each, and inserting 0 as the lowest order tap value) and the immediately antecedent coefficient vector (approximately, obtained from shifting each tap value of the FIR filter toward the lower order side by one each, and inserting 0 as the highest order tap value) in the same condition with respect to the coefficient vector obtained upon calculation of the above-mentioned equalizer error output may be applied as the above-mentioned predetermined restricting conditioning vector.

Thereby, with a relatively simple operation, a training operation in which the frequency characteristic is adjusted under a condition in which the gain of the FIR filter is fixed, and/or, the phase thereof is fixed can be continued. Thereby, with a relatively simple configuration, it becomes possible to avoid instability in control due to interference between the equalizer training loop and the gain control loop and phase control loop, and, also, to provide a method of training the FIR equalizer by which the situation change can be well followed up in a real-time manner.

Thus, according to the present invention, it is possible to provide, with a relatively simple configuration, a method of equalizer coefficient training so as to optimize the coefficients of the equalizer by adjusting the frequency characteristic of the equalizer in a condition in which the gain and phase delay amount of the equalizer are positively and properly restricted. Accordingly, even upon aging or so which may cause characteristic degradation of the recording medium or so in the recording medium reproduction apparatus, the read signal read out from the recording medium can be reproduced positively at a well reduced error rate.

DETAILED DESCRIPTION OF THE PREFERRED EMBODIMENTS

First, a principle of one embodiment of the present invention will now be described.

Figure 1:
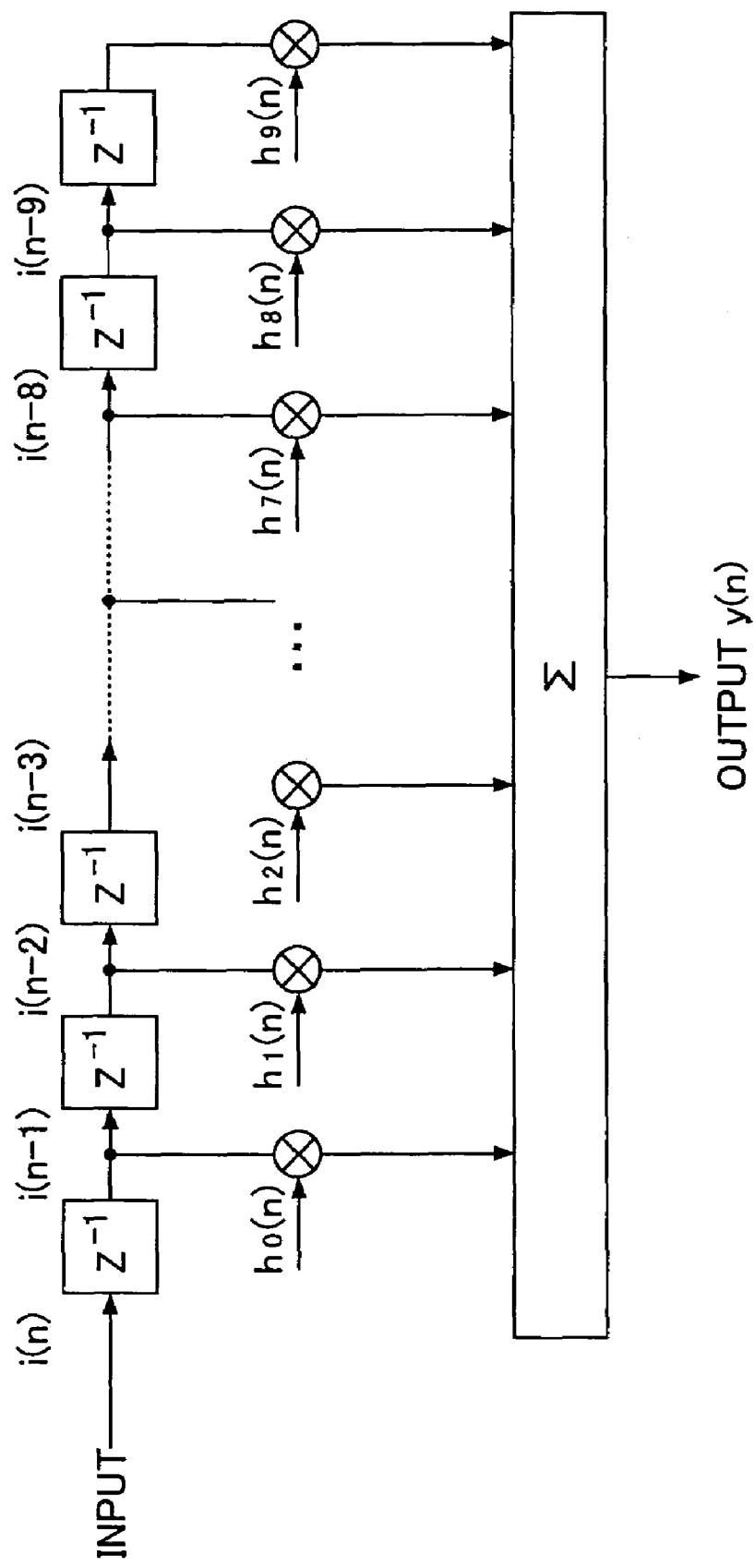
FIG. 1 shows a block diagram showing an outline configuration of a FIR filter applicable to an equalizer body in one embodiment of the present invention.

FIG. 1 shows a general circuit configuration of an FIR equalizer applied to an equalizer in the embodiment of the present invention. As shown, the FIR equalizer includes a plurality of delay devices (tap registers) $Z^{-1}$ having a signal i(n) input thereto after undergoing predetermined signal processing after being read out from a magnetic recording medium, and delaying the input signal in sequence, multipliers (X) which multiply by predetermined equalizer coefficients h0(n), h1(n), h2(n), . . . , h9(n) the thus-delayed input signals i(n−1), i(n−2), . . . , i(n−9), respectively, and an adder Σ which add the thus-obtained multiplication results together.

Assuming that an input signal vector with values thus delayed in sequence is expressed by the following formula:

$$I(n)=(i(n),i(n-1),i(n-2), \ldots ,i(n-7),i(n-8),i(n-9)),$$

and, further assuming that an equalizer coefficient vector is expressed by the following formula:

$$H(n)=(h_0(n),h_1(n),h_2(n), \ldots ,h_7(n),h_8(n),h_9(n)),$$

the output of the equalizer can be expressed by the following formula:

$$y(n) = I(n) \cdot H(n)^T = \sum_{h=0}^{9} h_k(n)i(n-k)$$

In a case of reproduction from a magnetic recording medium, read data is decoded based on the output of the equalizer, then, a difference is obtained between the thus-obtained decoded data (determination result) and the output of the equalizer, and the thus-obtained difference is regarded as an equalizer error output. Then, the above-mentioned LMS method is applied so that the thus-obtained equalizer error output becomes minimum through a control operation for appropriately adjusting the equalizer coefficients.

Assuming that the above-mentioned decoded data is expressed by $$\hat{y}(n),$$

the above-mentioned equalizer error output, which is the difference between this and the above-mentioned equalizer output y(n), is expressed by the following formula:

$$e(n)=y(n)-\hat{y}(n).$$

Further, the equalizer coefficient vector H(n+1) subsequent one clock timing with respect to the equalizer coefficient vector at the current time H(n) is expressed by the following formula:

$$H(n+1)=H(n)-\mu e(n)I(n) \quad (1)$$

with the above-mentioned equalizer error output e(n) and the input signal vector I(n). In the above formula (1), μ denotes a predetermined loop constant. Thus, the input signal vector I(n) is used as a coefficient updating vector for updating the equalizer coefficients H(n). According to the LMS method, the equalizer coefficients are thus updated each time, and, thus, are adjusted while equalization operation is performed, where the respective equalizer coefficients are adjusted in such a manner that by which the squire of the equalizer error output e(n) thus obtained becomes minimum.

As mentioned above, there is a problem, in a recording medium reproduction apparatus including a read channel LSI for a hard disk or so, that, especially in handling a preamble of a recording medium, the above-mentioned AGC loop and TR loop interfere with the equalizer training loop and vise versa, so that the behavior of the entire loop control may become unstable. In order to solve this problem, for example, in the equalizer training, a restricting conditioning vector C expressed by the following formula may be applied for restricting or controlling a manner of updating the equalizer coefficients:

$$C = (c_0, c_1, c_2, \ldots, c_7, c_8, c_9)$$
$$= (0, 1, 0, -1, 0, 1, 0, -1, 0, 1) \text{ or } (1, 0, -1, 0, 1, 0, -1, 0, 1, 0).$$

A vector is obtained from projecting the above-mentioned coefficient updating vector I(n) onto a plane perpendicular to the above-shown restricting conditioning vector C. The thus-obtained vector is applied as a new coefficient updating vector in actually updating the equalizer coefficients.

Thus, when a signal corresponding to the above-mentioned restricting conditioning vector C is given, the output of the FIR equalizer is made to have a fixed value K (constant), as shown in the following formula:

$$C \cdot H(n)^T = K(\text{const.})$$

As a result, as mentioned above, it becomes possible to maintain the frequency response to the signal from the preamble of the recording medium to a fixed value. Then, as a result, it becomes possible to avoid diversion of the equalizer coefficients even for the preamble. Further, in this case, as mentioned above, $$(C,I(n))=0.$$

That is, the manner of updating the equalizer coefficients is restricted so that the coefficient updating vector should be made perpendicular to the restricting conditioning vector at any time. The new coefficient updating vector I'c(n) thus obtained from the above-mentioned orthogonal projection is expressed by the following formula:

$$I'c(n) = I(n) - \frac{(C, I(n))}{(C, C)} C.$$

Figure 2:
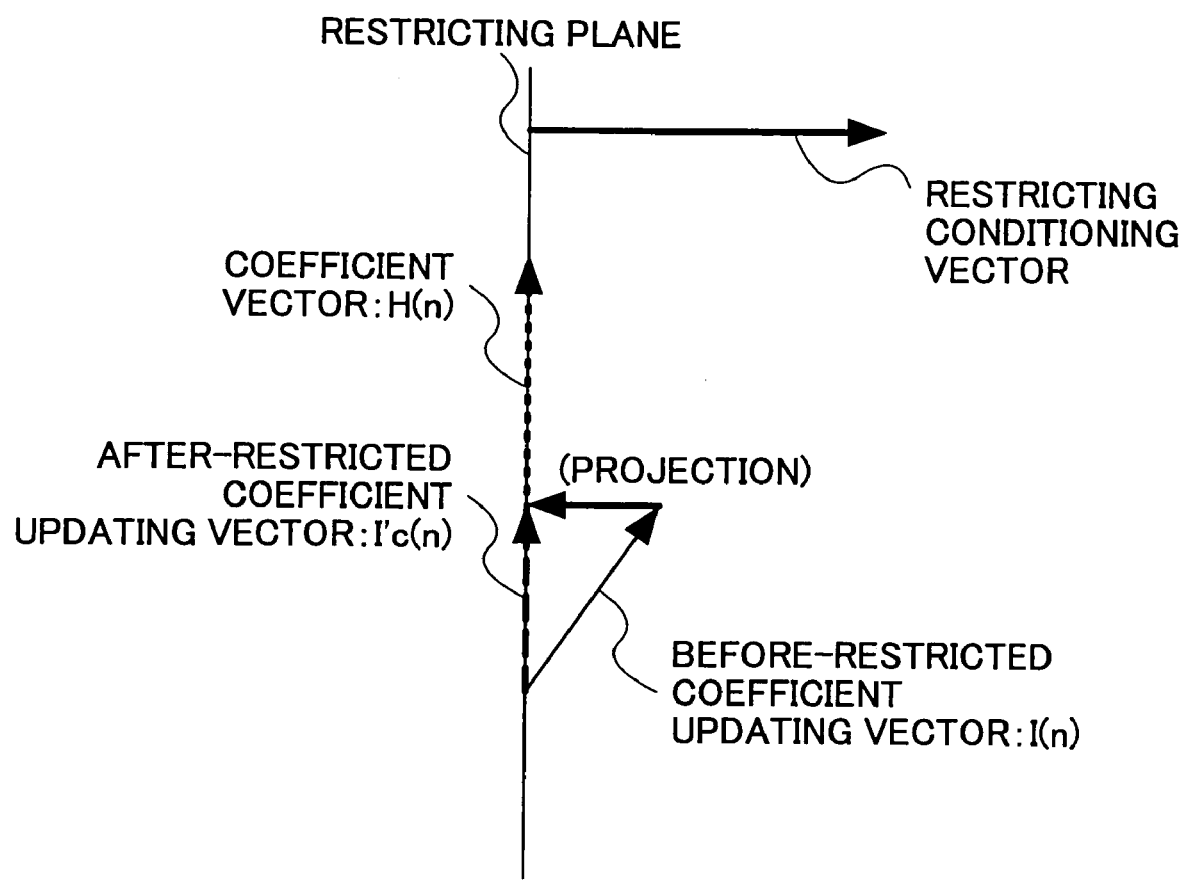
FIG. 2 shows a vector diagram illustrating an example of a restricting manner with a coefficient updating vector in the related art.

FIG. 2 illustrates the above-mentioned respective vectors.

However, in this method, as the frequency characteristic of the equalizer is fixed for the preamble, the equalizer training is substantially stopped there. As a result, real-time following-up performance is abandoned there as mentioned above.

In order to solve this problem, how to obtain the restricting conditioning vector for satisfying the gain constant requirement of the FIR equalizer according to a first embodiment of the present invention will now be described.

The restricting condition to be satisfied for fixing the gain is obtained approximately from the following formula:

$$|H(n)|^2 = H(n) \cdot H(n)^T = L(\text{const.}).$$

That is, in order to fix the gain of the equalizer, the magnitude of the equalizer coefficient vector H(n) corresponding to the equalizer coefficients, which are multiplied by the respective delayed signals by the multipliers (X) shown in FIG. 1 should be fixed. For this purpose, approximately, a condition is applied by which the equalizer coefficient vector H(n) and the coefficient updating vector I(n) are made perpendicular to one another. That is, the requirement expressed by the following formula should be satisfied:

$$(H(n),I(n))=0.$$

That is, the current equalizer coefficient vector H(n) is used as the restricting conditioning vector C. Thereby, it is possible to achieve the equalizer training with a condition approximately fixing the gain. The new restricting conditioning vector I'g(n) which should be applied as the restricting conditioning vector at this time is expressed by the following formula (2):

$$I'g(n) = I(n) - \frac{(H(n), I(n))}{(H(n), H(n))} H(n). \quad (2)$$

Figure 3:
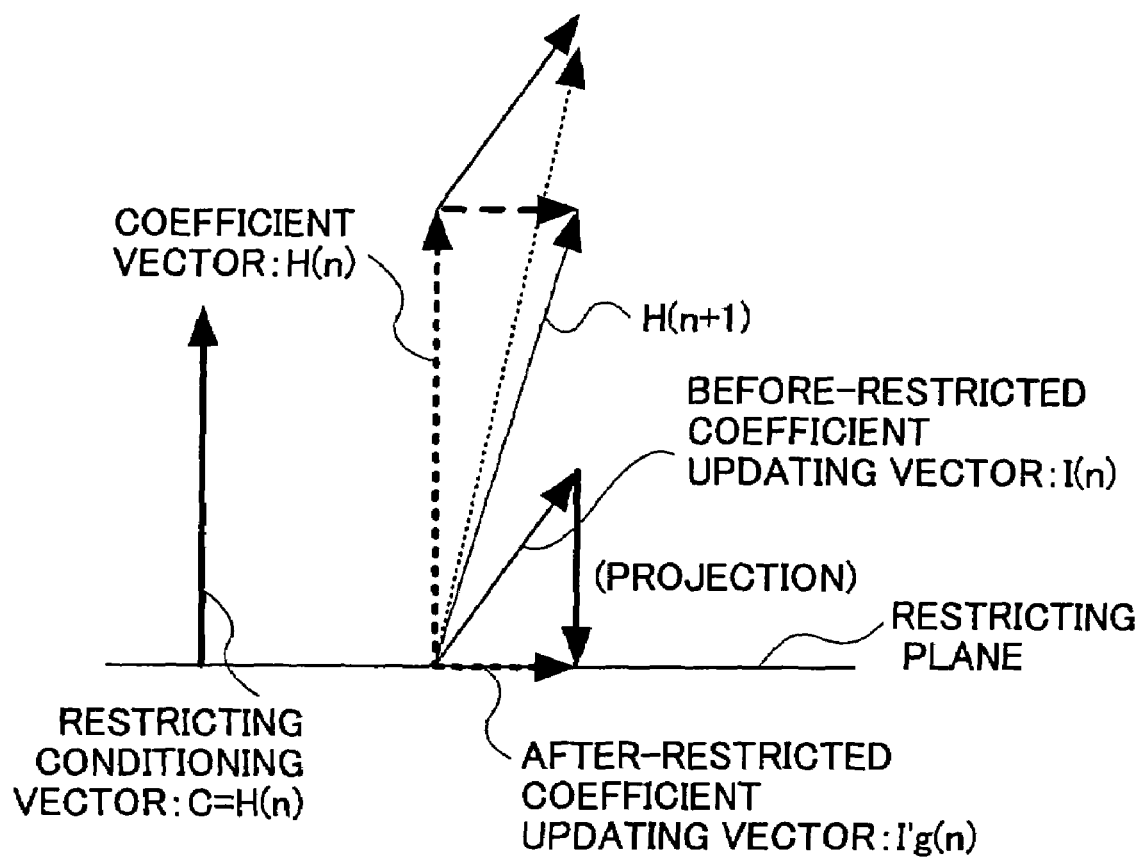
FIG. 3 shows a vector diagram illustrating an example of an equalizer gain restricting manner with the coefficient updating vector according to a training method for the equalizer in one embodiment of the present invention.

The vector diagram at this time is shown in FIG. 3. In FIG. 3, by restricting the coefficient vector along a direction perpendicular to the H(n), a fluctuation of the equalizer characteristics along the gain direction can be made minimum. In fact, the before-restricted coefficient updating vector I(n) is projected onto the restricting plane perpendicular to the restricting conditioning vector C, so as to become the after-restricted coefficient updating vector I'g(n). Thereby, the equalizer coefficient vector H(n) is updated into the equalizer coefficient vector H(n+1) having approximately the same magnitude, by this coefficient updating vector I'g(n). Thus, the equalizer training with approximately fixing the gain can be achieved.

A method for obtaining a restricting condition satisfying a requirement of fixing the delay amount according to the embodiment of the present invention will now be described. In order to perform optimization of the respective coefficients of the equalizer with the equalizer training by means of the coefficient vector H(n) with a control for adjusting the frequency characteristic with maintaining approximately at a fixed value the phase delay amount given to the input signal, the updating should be made in a condition in which a difference between the autocorrelation of the coefficient vector H(n) with itself and a correlation between the coefficient vector H(n) and the coefficient vector sH(n) subsequent one clock timing obtained in the same condition, i.e., in case of having not undergoing the coefficient updating yet with respect to the coefficient vector H(n) should be made to have a fixed value.

It is assumed that the current coefficient vector H(n) of the equalizer is expressed by the following formula:

$$H(n)=(h_0(n),h_1(n),h_2(n), \ldots, h_7(n),h_8(n),h_9(n)).$$

Then, the above-mentioned coefficient vector which is obtained after the elapse of one clock timing with respect thereto can be expressed by the following formula:

$$sH(n)=(0,h_0(n),h_1(n), \ldots, h_6(n),h_7(n),h_8(n)).$$

Then, a difference between the autocorrelation of the above-mentioned current coefficient vector with itself and the correlation between the current coefficient vector and the above-mentioned coefficient vector after the one clock timing should be made to have a fixed value as mentioned above. That is, the following formula should hold, where M denotes a constant:

$$((H(n)-sH(n)),H(n))=M \text{ (const.)}$$

There, in order to obtain the coefficient vector sH(n) after the elapse of one clock timing in the same condition, i.e., in case of not having undergone the coefficient updating yet with respect to the current coefficient vector H(n), the respective coefficients are shifted toward the higher tap side of the FIR filter and 0 is inserted as the lowest order coefficient, as an approximating manner.

In order to satisfy the above-mentioned requirement, from the above-mentioned formula (1), the coefficient updating vector I(n) should satisfy the following formula:

$$((H(n)-sH(n)),I(n))=0$$

In other words, the restricting conditioning vector C is obtained as (H(n)−sH(n)). The new coefficient updating vector I'p(n) satisfying this requirement in this case can be obtained through a vector operation with the following formula:

$$I'p(n) = I(n) - \frac{((H(n) - sH(n)), I(n))}{((H(n) - sH(n)), (H(n) - sH(n)))}(H(n) - sH(n))$$

Further, a method by which the degree of restricting is further increased will now be described. s⁺H(n) which denotes the coefficient updating vector subsequent one clock timing in the same condition, i.e., in case of not having undergone the coefficient updating yet, and s⁻H(n) which denotes the coefficient updating vector antecedent one clock timing with respect to the current coefficient updating vector H(n) in the same condition, i.e., assuming not performing the coefficient updating therebetween, can be expressed by the following formulas, respectively:

$$s^+H(n)=(0,h_0(n),h_1(n), \ldots, h_7(n),h_8(n))$$

$$s^-H(n)=(h_1(n), \ldots, h_7(n),h_8(n),h_9(n),0)$$

Also in this case, the coefficient updating vector subsequent one clock timing is obtained in an approximating manner by shifting the respective coefficients toward the higher order side and inserting 0 as the lowest order coefficient, while the coefficient updating vector antecedent one clock timing is obtained also in an approximating manner by shifting the respective coefficients toward the lower order side and inserting 0 as the highest order coefficient.

Further, also in this case, same as in the above-mentioned case, in order to satisfy the requirement of fixing the phase delay amount, a difference between a correlation between the current coefficient vector and the coefficient vector subsequent one clock timing and a correlation between the current coefficient vector and the coefficient vector antecedent one clock timing should have a fixed value. That is, the following formula should hold, where N denotes a constant:

$$((s^+H(n)-s^-H(n)),H(n))=N \text{ (const.)}$$

For this purpose, from the above-mentioned formula (1), the coefficient updating vector I(n) (I'pp(n)) to be obtained should satisfy the following requirement:

$$((s^+H(n)-s^-H(n)),I(n))=0$$

That is, in this case, the restricting conditioning vector C is obtained as (s⁺H(n)−s⁻H(n)). Further, the new coefficient updating vector I'pp(n) satisfying the restricting condition to be obtained is obtained from the following formula (3) by a vector operation:

$$I'pp(n) = I(n) - \frac{((s^+H(n) - s^-H(n)), I(n))}{((s^+H(n) - s^-H(n)), (s^+H(n) - s^-H(n)))}(s^+H(n) - s^-H(n)) \quad (3)$$

Figure 4:
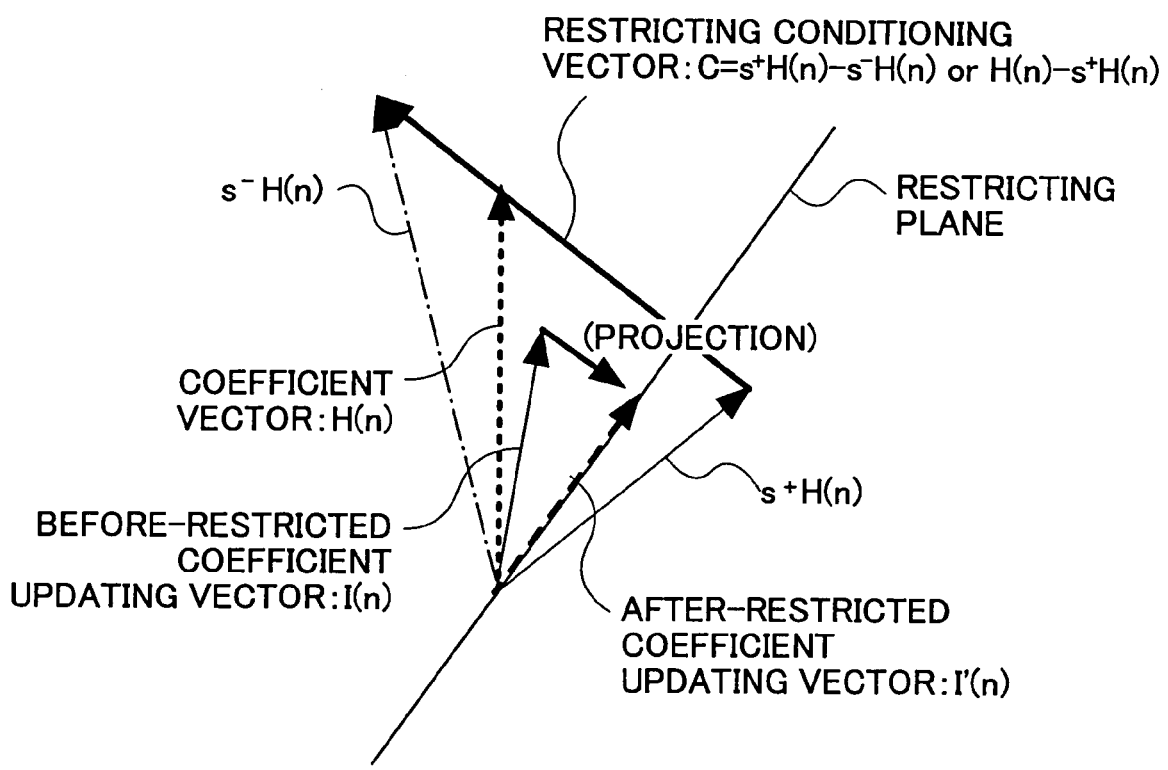
FIG. 4 shows a vector diagram illustrating an example of an equalizer phase delay amount restricting manner with the coefficient updating vector according to the training method for the equalizer in the embodiment of the present invention.

FIG. 4 illustrates a vector diagram showing a biding manner of the coefficient updating vector I(n) for satisfying the above-mentioned requirement of fixing the phase delay amount. As shown, a vector of the difference between the coefficient vector s⁺H(n) subsequent one clock timing and the coefficient vector s⁻H(n) antecedent one clock timing with respective to the current coefficient vector H(n) in the same condition is regarded as the restricting conditioning vector C. Then, onto the restricting plane perpendicular to this restricting conditioning vector C, the coefficient updating vector I(n) before restricted is projected. Thereby, the coefficient updating vector I(n) is restricted and thus the after-restricted coefficient updating vector I'(n) is obtained.

Each of the manner of restricting the coefficient updating vector under the condition of fixing the gain described above with reference to FIG. 3 and the manner of restricting the coefficient updating vector under the condition of fixing the phase delay amount described above with reference to FIG. 4 may be applied to the equalizer independently by itself. However, it is preferable that, as will be described for an actual circuit configuration in the embodiment of the present invention, both of them are applied together simultaneously.

A configuration of the embodiment of the present invention which applies the above-mentioned principle will now be described with reference to figures.

Figure 5:
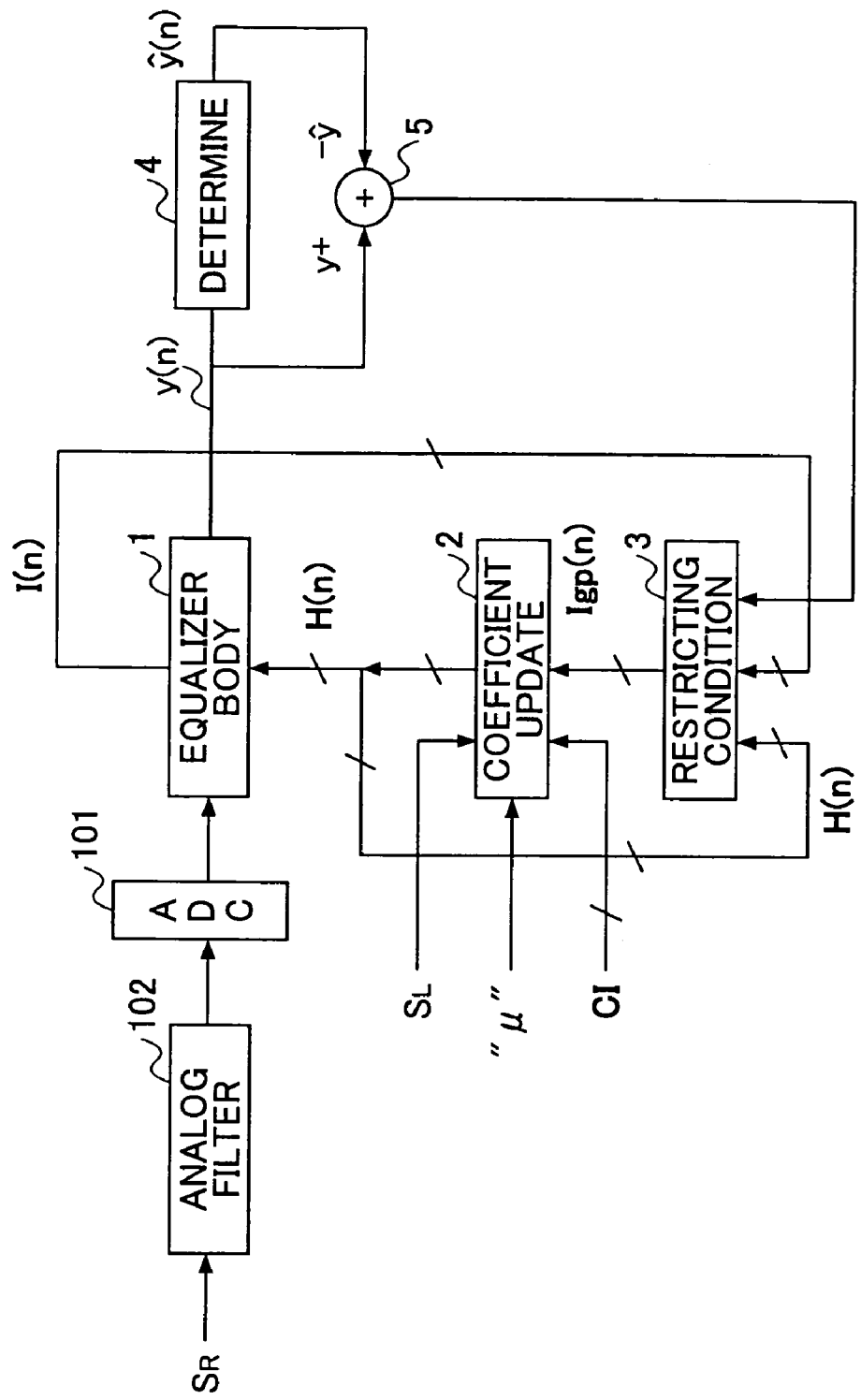
FIG. 5 shows a block diagram of a read signal equalizer as a recording medium reproduction apparatus in the embodiment of the present invention.

FIG. 5 shows a general block diagram of the equalizer which applies the restricting conditional training method in the embodiment of the present invention. The equalizer includes an analog filter 102, an A/D converter 101, an equalizer body 1, a coefficient updating circuit 2, a restricting conditioning part 3, a determination device 4, and an adder 5, as shown.

In this equalizer, predetermined equalizing processing is performed on an analog read signal SR read from a recording medium with the analog filter 102, it is sampled by the A/D converter 101, and is converted into a digital signal. Predetermined digital processing is performed on the thus-obtained digital signal by the equalizer body 1 where the digital signal undergoes equalizing processing further precisely so that a predetermined target response may be obtained therefrom. Determination processing is performed on the output of the equalizer body 1 by the determining device 4, and thus, a determined signal $\hat{y}$, which is a reproduction signal, regarded as an ideal target response, is obtained.

The equalized signal y (the output of the equalizer body 1) includes an equalization error due to noise, distortion or so, and this error should be minimized. For this purpose, an equalization error signal e(n) which is a difference between the equalized signal y and the above-mentioned determined signal $\hat{y}$ is obtained by the adder 5, as shown in FIG. 5. Then, by functions of the restricting conditioning part 3, coefficient updating circuit 2, and so forth, training of the coefficients of the equalizer body 1 is performed, and thereby, the coefficients (multiplication coefficients) of the equalizer body 1 are always maintained to the optimum values.

That is, the restricting conditioning part 3 performs vector operation such as to obtain a restricting condition vector Igp(n) based on the above-mentioned error signal e(n), the tap vector (coefficient updating vector) I(n) having the tap values (delay input values) which are those input to the respective delay devices of the FIR filter of the equalizer body 1, and the equalizer coefficient vector H(n) having the coefficients by which the respective tap values in the equalizer body 1 are multiplied.

A predetermined loop constant μ, an initial value vector CI, and an initial value load signal $S_L$ giving a timing to load the initial value are input to the coefficient updating circuit 2, which then makes the equalizer coefficients to reflect the value of the error signal e(n) so as to update the equalizer coefficients along a coefficient updating direction, i.e., the updating ratio of the respective taps of the equalizer body 1, which is determined by the after-restricted coefficient updating vector Igp(n) input from the boding conditioning part 3.

That is, according to the method for determining the "restricting conditioning vector C" described above with reference to FIGS. 2 through 4, the bonding conditioning part 3 determines the restricting conditioning vector C by a vector operation on the conditions that change in the gain and phase delay amount of the equalizer body 1 are restricted approximately. Then, the restricting conditioning part 3 obtains the after-restricted coefficient updating vector Igp(n) on the conditions of restricting (projecting) the coefficient updating vector I(n) which is equivalent to the tap vector of the equalizer body 1 onto the restricting plane which is perpendicular to the thus-determined restricting conditioning vector C. The restricting conditioning part 3 then supplies the thus-obtained coefficient updating vector Igp(n) to the coefficient updating circuit 2.

Figure 9:
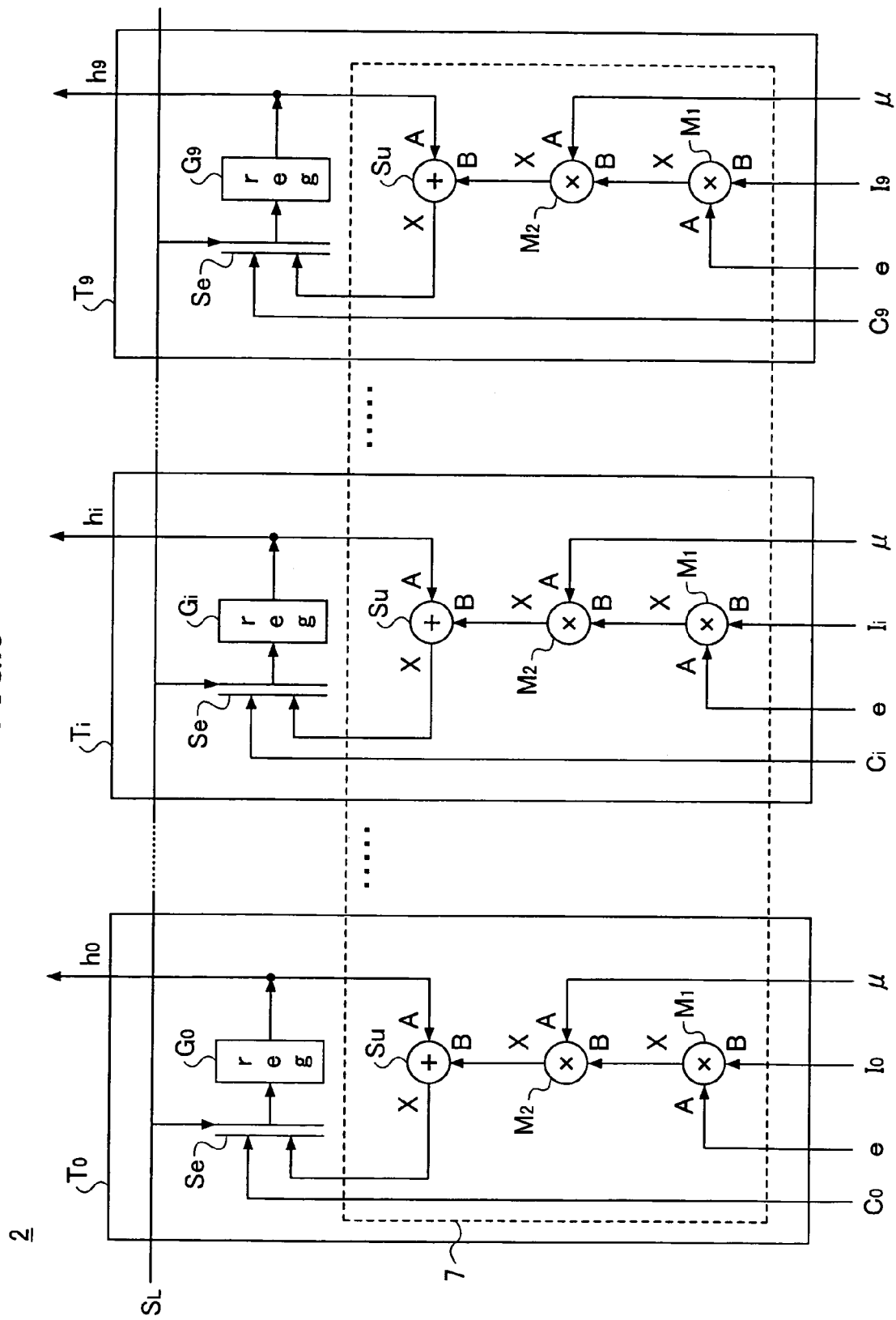
FIG. 9 shows a circuit diagram showing a configuration of the coefficient updating circuit as well as an internal configuration of a coefficient updating part shown in FIG. 6.

That is, a loop performing feedback of a scalar product between the coefficient updating vector I(n)=($i_0$, $i_1$, $i_2$, ..., $i_9$) output from the respective registers (delay devices) $D_1$, $D_2$, $D_3$, ..., $D_9$ of the filter taps 201 (see FIG. 6) of the equalizer body 1 and the error signal e(n) is provided (see FIG. 9). Therewith, the equalizer coefficient vector H(n)= ($h_0$, $h_1$, $h_2$, ..., $h_9$) is updated.

Details of the respective parts of the equalizer will now be described.

Figure 6:
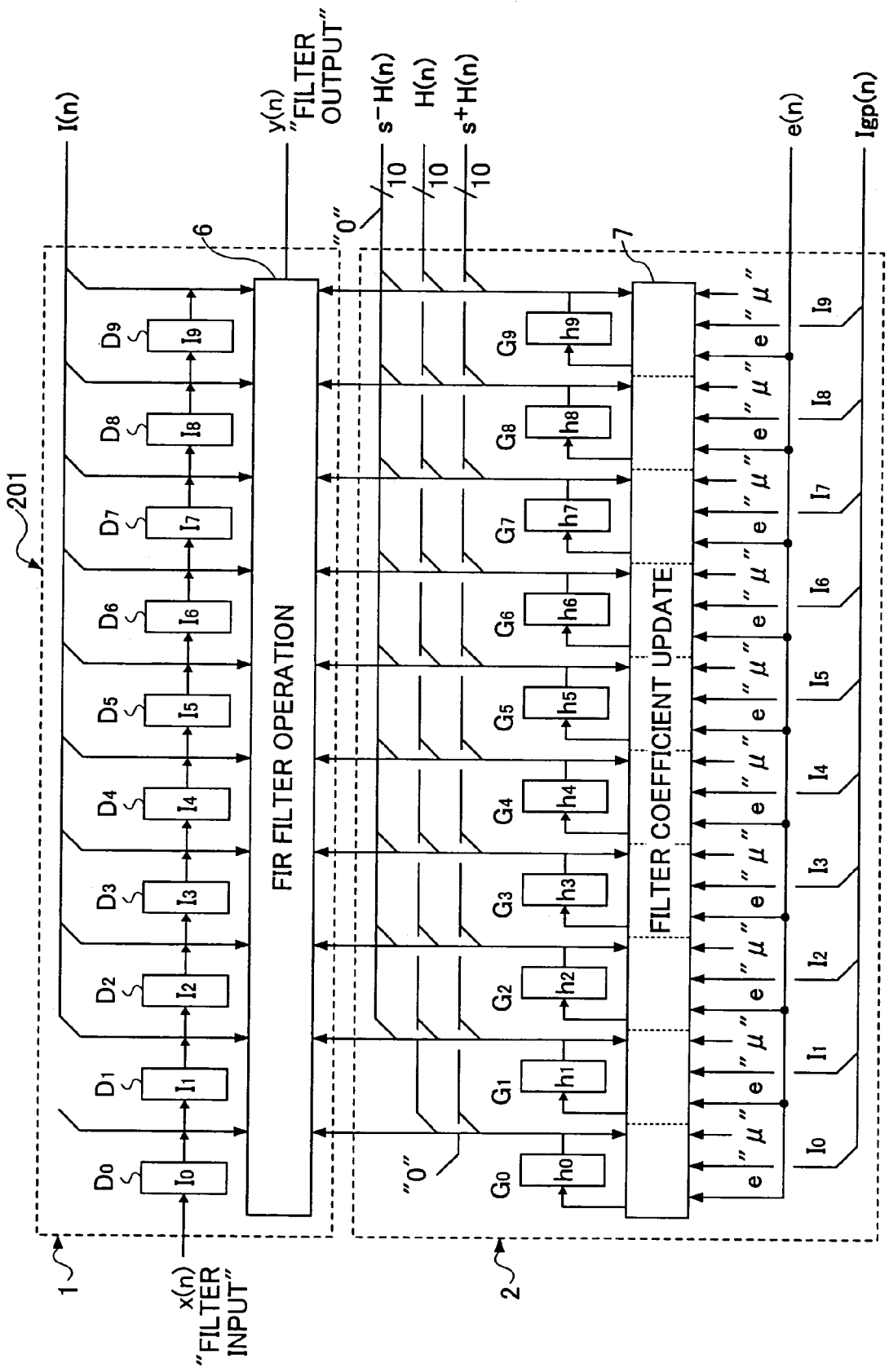
FIG. 6 shows a circuit diagram showing the equalizer body shown in FIG. 5, and an internal configuration of a coefficient updating circuit.
Figure 8:
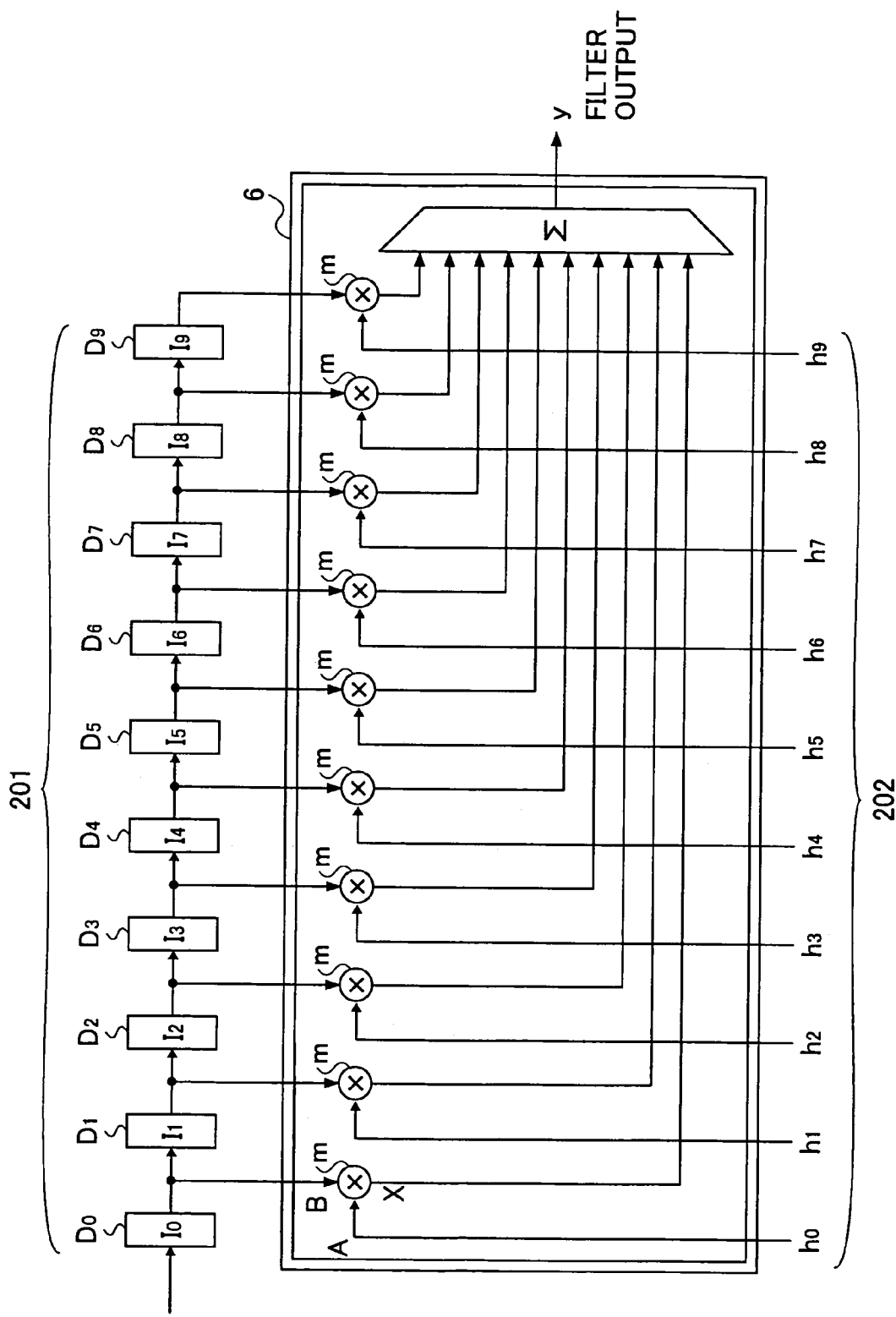
FIG. 8 shows a circuit diagram showing a configuration of the equalizer body part as well as an internal configuration of an FIR filter operation part shown in FIG. 6.

FIG. 6 shows an internal configuration of the above-mentioned equalizer body 1 and the coefficient updating circuit 2. As shown, the equalizer body 1 has a configuration of a FIR filter, and includes an FIR filter operation part 6, and tap registers (delay devices) $D_0$ through $D_9$, for the respective filter taps 201. The configuration of this equalizer body 1 is equivalent to the configuration of the FIR equalizer shown in FIG. 1. FIG. 8 shows an internal configuration of the above-mentioned FIR filter operation part 6. As shown, this operation part 6 includes a sum-of-product operation circuit which includes multipliers m provided for the respective filter taps 120 and an addition part Σ which totals the multiplication results thereof.

In the equalizer body 1 which has such a configuration, a value of the read signal SR sampled by the A/D converter 101 is shifted to the tap registers $D_0$ through $D_9$ in sequence, and, each time of shift, the equalizer coefficients $h_0$ through $h_9$ in the respective coefficients registers $G_0$ through $G_9$ are used to multiply the values in these registers by the multipliers m. Then, the total thereof is obtained by the addition part Σ and is output as the filter output y. The above-mentioned equalizer coefficient vector H(n) is configured by the respective ones of these equalizer coefficients $h_0$ through $h_9$, as the components thereof.

The coefficient updating circuit 2 includes a coefficient updating part 7, and coefficient registers $G_0$ through $G_9$ provided for the respective taps. FIG. 9 shows further details of this coefficient updating circuit 2. As shown, the coefficient updating part 7 has, for each tap, a sum-of-product circuit, and includes a multiplier $M_1$ which multiplies the respective components $I_0$ through $I_9$ of the after-restricted coefficient updating vector Igp(n) supplied from the restricting conditioning part 3 by the error signal e(n) (common for the respective taps) supplied by the adder 5 as a feedback signal, and a multiplier $M_2$ further multiplying the multiplication result of the multiplier $M_1$ by the above-mentioned loop constant μ.

The action of this feedback loop is adjusted by this loop constant μ. Moreover, this coefficient updating part 7 has an adder Su which adds the multiplication result of the multiplier $M_2$ to the equalizer coefficient obtained last time, and thus updates the equalizer coefficient for each tap. Moreover, a selector Se is also provided for each tap and sets an initial value $C_0$ through $C_9$ to the respective coefficient register $G_0$ through $G_9$ at a timing provided by the initial value load signal $S_L$.

Thus, the after-restricted updating vector Igp is integrated, and, thus, the equalizer coefficients are updated at the predetermined timing.

Figure 7:
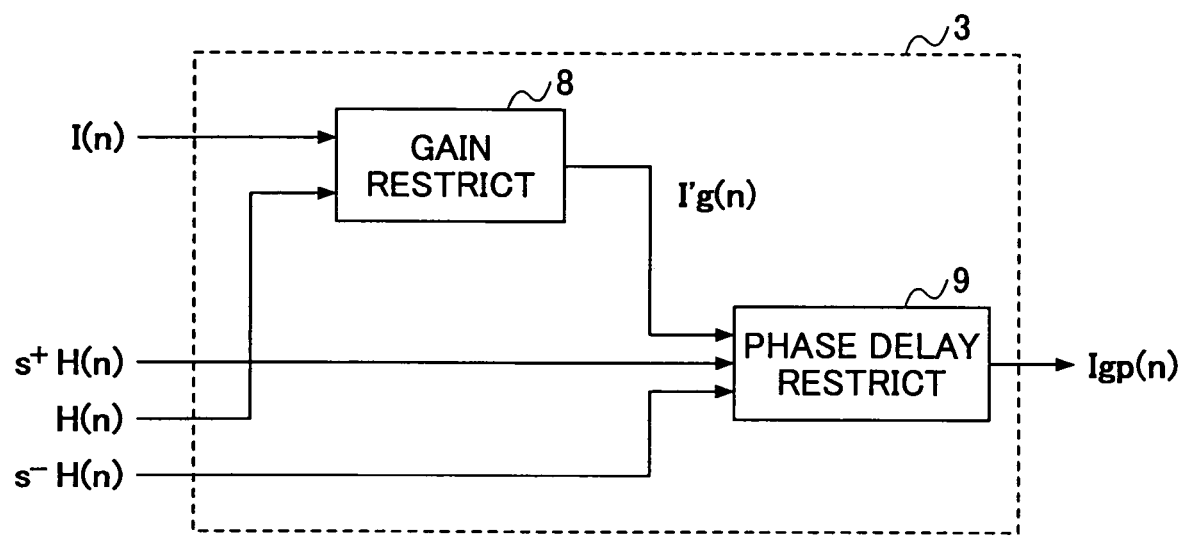
FIG. 7 shows a circuit diagram showing an internal configuration of a restricting conditioning part shown in FIG. 5.

FIG. 7 shows an internal configuration of the above-mentioned restricting conditioning part 3. As shown, this restricting conditioning part 3 includes a gain restricting part 8 and a phase delay restricting part 9. The equalizer coefficient vector H(n) supplied to the restricting conditioning part 3 has values ($h_0$ through $h_9$) in the respective coefficient registers $G_0$ through $G_9$ shown in FIG. 6; the above-mentioned equalizer coefficient vector $s^+H(n)$ subsequent one clock timing has "0" and the values in the coefficient registers $G_0$ through $G_8$ (0, $h_0$ through $h_8$); and the above-mentioned equalizer coefficient vector $s^-H(n)$ antecedent one clock timing has the values in the coefficient registers $G_1$ through $G_9$ and "0" ($h_1$ through $h_9$, 0).

Figure 10:
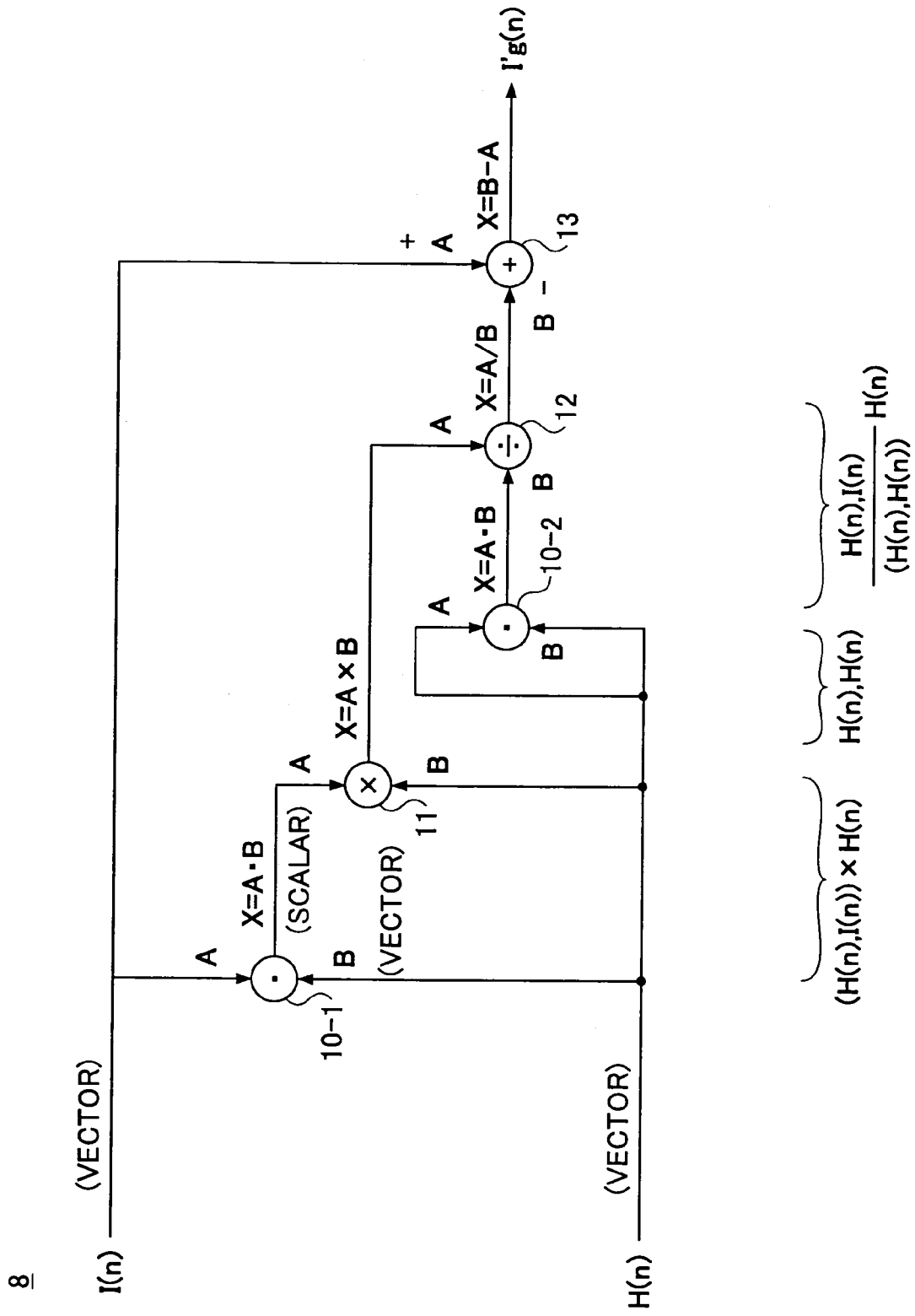
FIG. 10 shows a circuit diagram showing an internal configuration of a gain restricting part shown in FIG. 7.

FIG. 10 shows an internal configuration of the gain restricting part 8 of the restricting conditioning part 3. As shown, the gain restricting part 8 includes an inner product operator 10-1 performing inner product operation between the equalizer coefficient vector H(n) and the equalizer tap vector (before-restricted coefficient vector) I(n), a multiplier 11 which multiplies the equalizer coefficient vector H(n) by the thus-obtained inner product value as a scalar value in scalar product operation, an inner product operator 10-2 performing vector inner product operation of the equalizer coefficient vector by itself, a divider 12 which performs scalar division operation of the multiplication result of the multiplier 11 by the inner product value obtained from the inner product operator 10-2, and a subtractor 13 which performs vector subtraction of the division result of the divider 12 from the equalizer tap vector I(n). By this operation, the restricting conditioning vector I'g(n) for gain restricting, also shown in the formula (2) below, is obtained:

$$I'g(n) = I(n) - \frac{(H(n), I(n))}{(H(n), H(n))} H(n). \quad (2)$$

Figure 11:
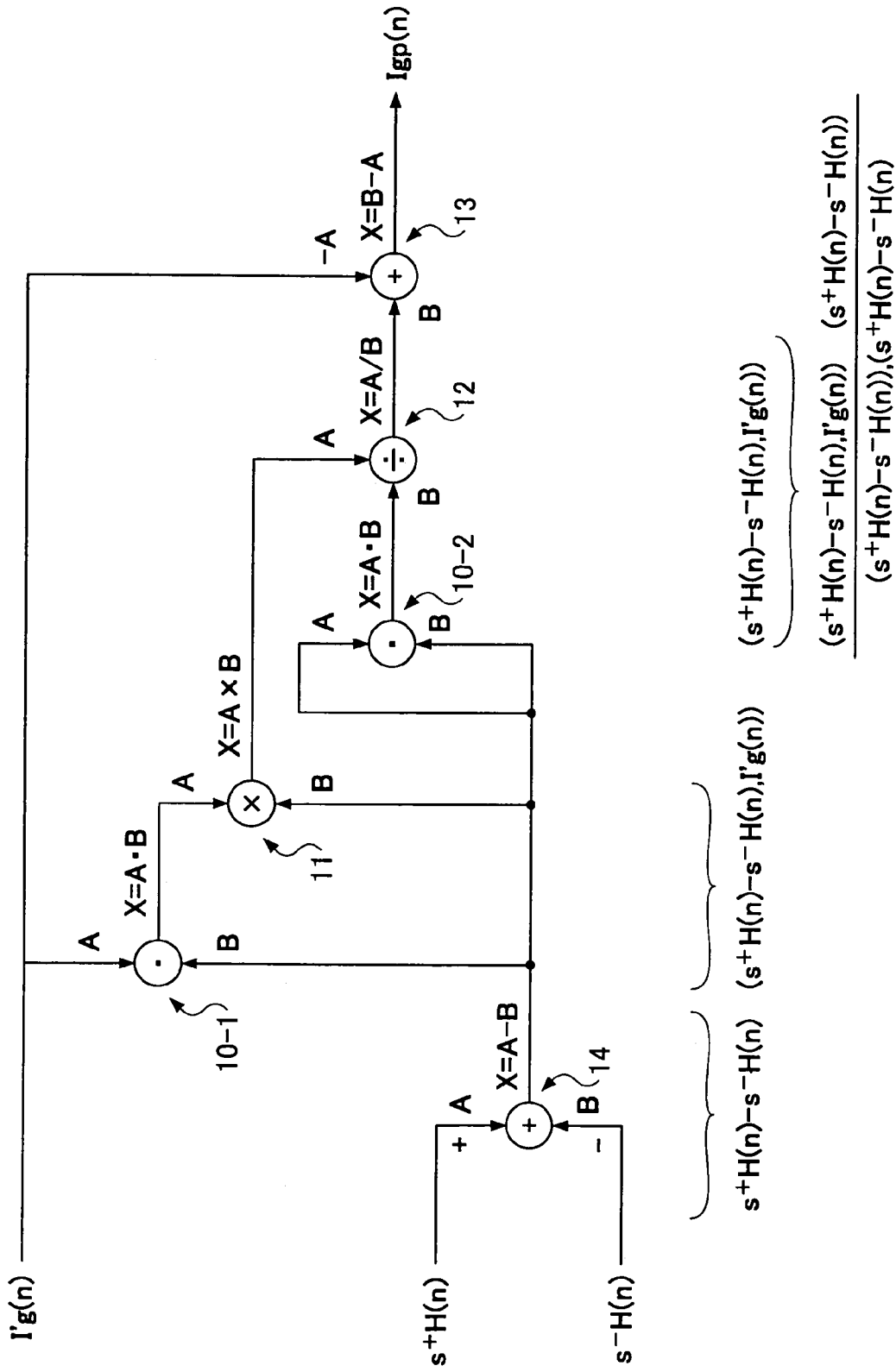
FIG. 11 shows a circuit diagram showing an internal configuration of a phase delay amount restricting part shown in FIG. 7.

FIG. 11 shows an internal configuration of the above-mentioned phase delay restricting part 9. As shown, the phase delay restricting part 9 includes an adder (subractor) 14 calculating a difference between the equalizer coefficient vector $s^+H(n)$ subsequent one clock timing and the equalizer coefficient vector $s^-H(n)$ antecedent one clock timing, an inner product operator 10-1 performing vector inner product operation between the after-gain-restricted coefficient updating vector I'g(n) output from the above-mentioned gain restricting part 8 and the subtraction result of the adder 14, an inner product operator 10-2 performing vector product operation on the output of the adder 14 by itself, a divider 12 which performs scalar division operation on the output of the multiplier 11 by the inner product result of the inner product operator 10-2, and a subtractor 13 which performs subtraction of the above-mentioned after-gain-restricted coefficient updating vector I'g(n) from the division result of the divider 12.

By this configuration, via an operation (3') below equivalent to the operation of the above-mentioned formula (3), a coefficient updating vector Igp(n) is obtained as a result of restricting the phase delay amount being further performed on the above-mentioned after-gain-restricted coefficient updating vector I'g(n).

$$Igp(n) = \qquad (3')$$
$$I'g(n) - \frac{((s^+H(n) - s^-H(n)), I'g(n))}{((s^+H(n) - s^-H(n)), (s^+H(n) - s^-H(n)))}(s^+H(n) - s^-H(n))$$

This after-restricted coefficient updating vector Igp(n) is supplied to the coefficient updating circuit 2.

Figure 12:
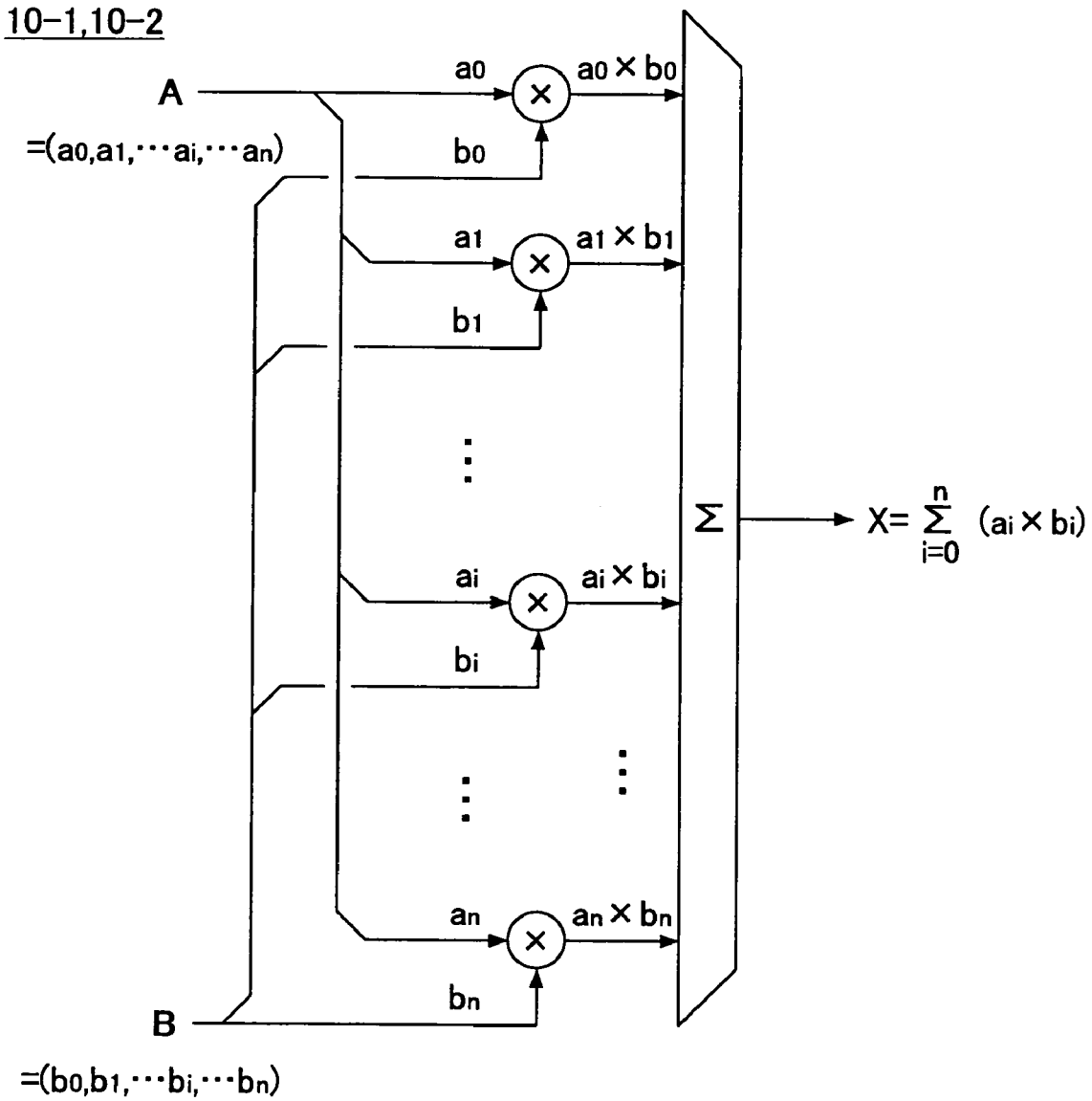
FIGS. 12, 13, 14 and 15 show circuit diagrams showing internal configurations of respective operation parts shown in FIGS. 10 and 11.
Figure 13:
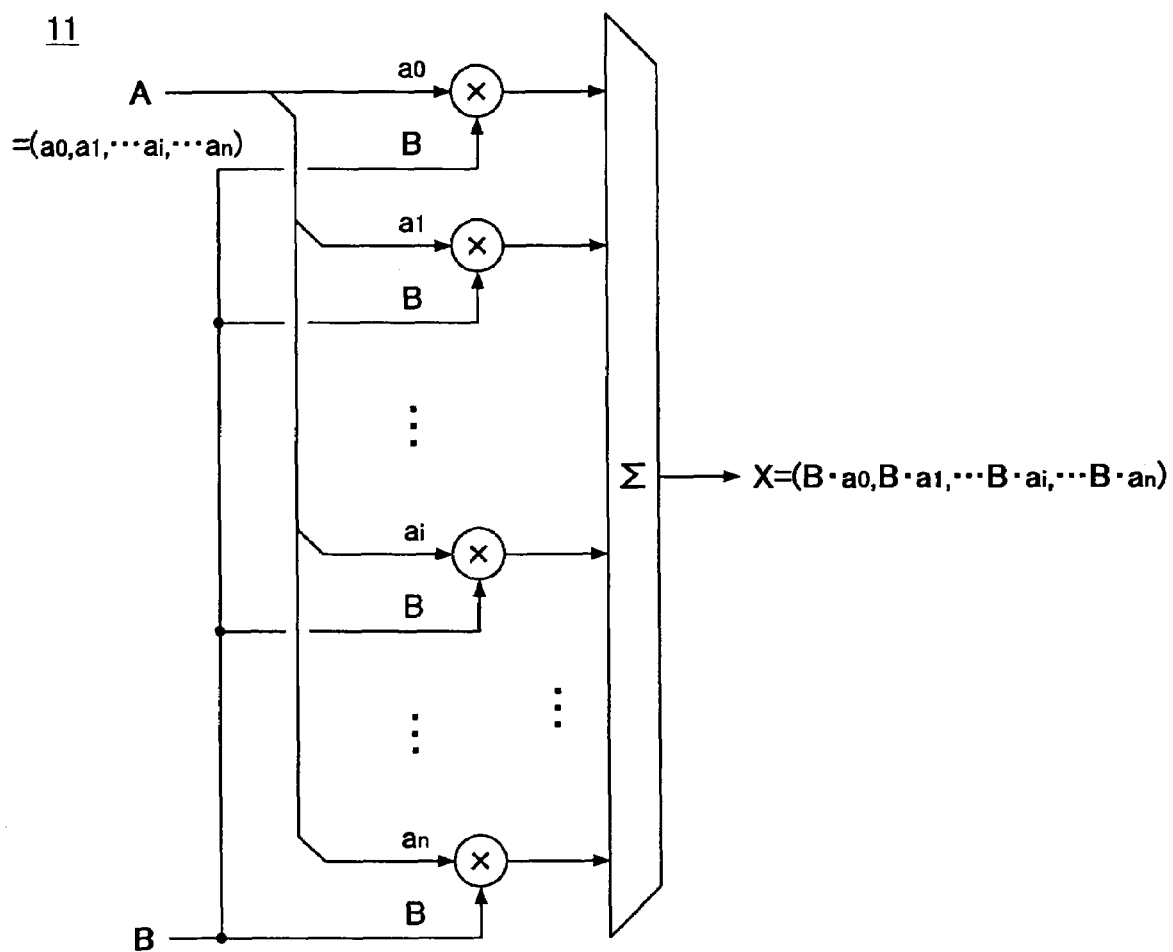
Figure 14:
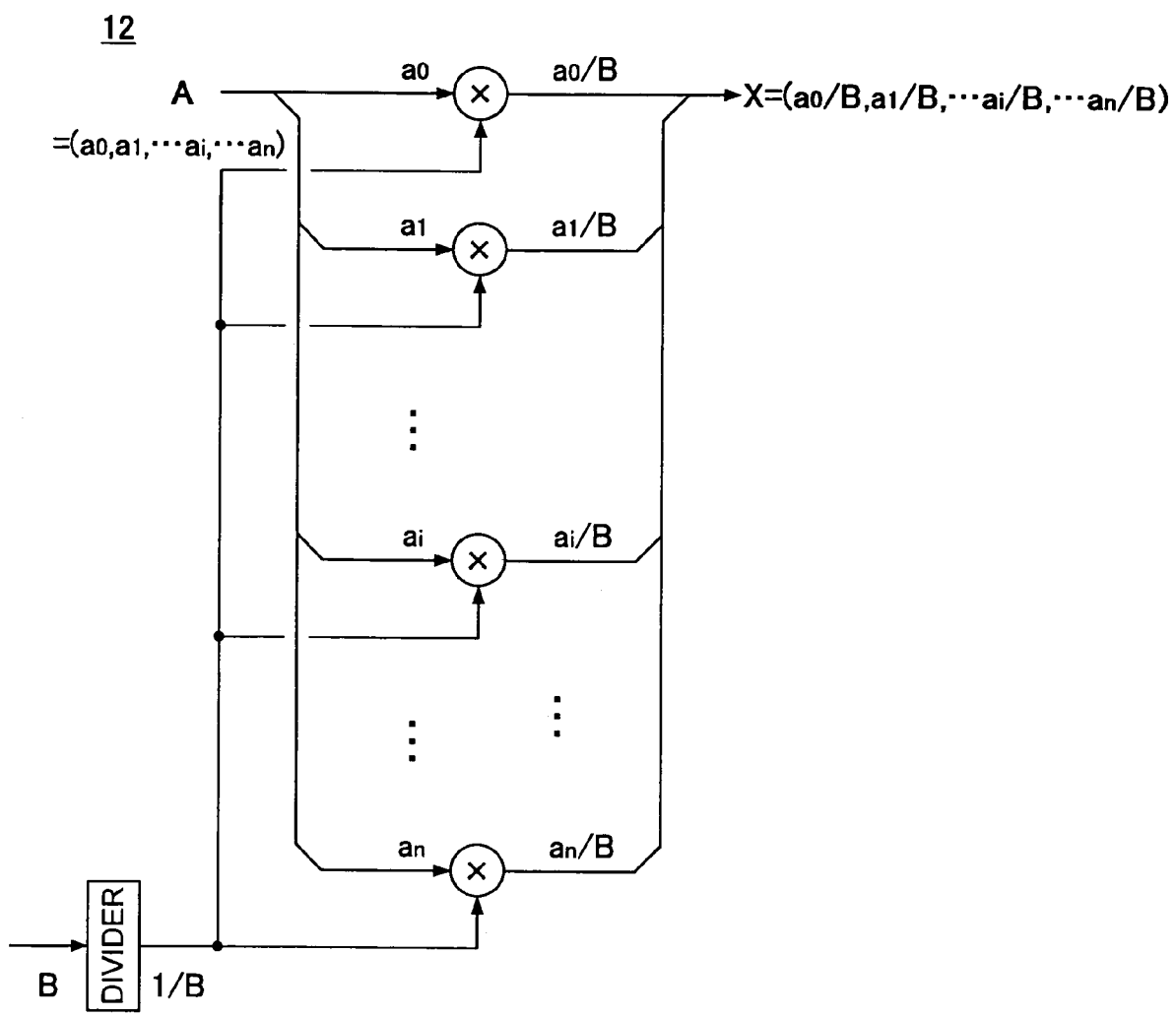
Figure 15:
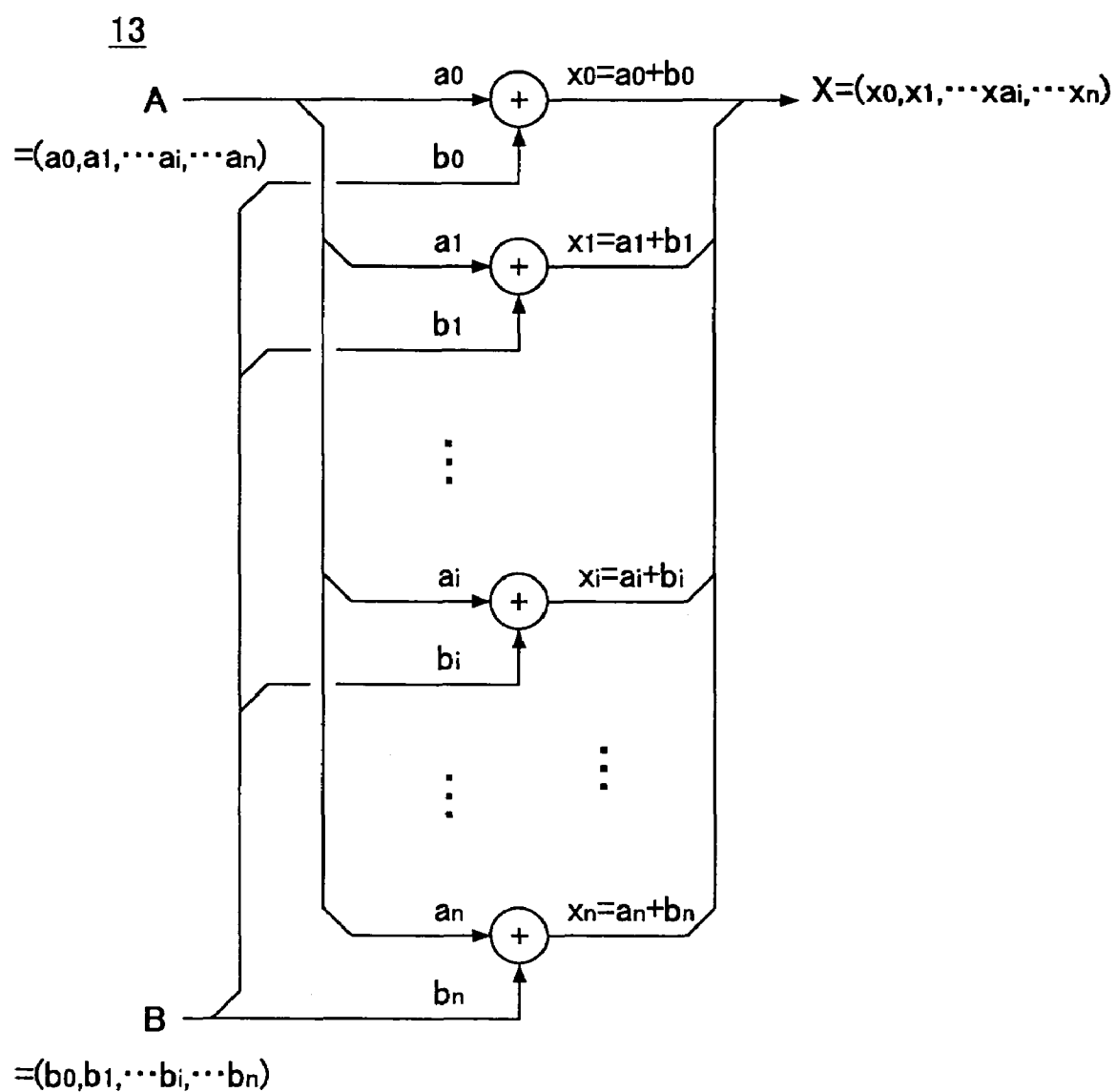

FIGS. 12 or 15 illustrate examples of detailed configurations of the above-mentioned vector inner product operators 10-1, 10-2, scalar product operator 11, scalar divider 14, and scalar adder 13. Detailed descriptions for the specific configurations and operations of the respective operators are omitted here since they are self-explanatory from the configurations shown.

Figure 16:
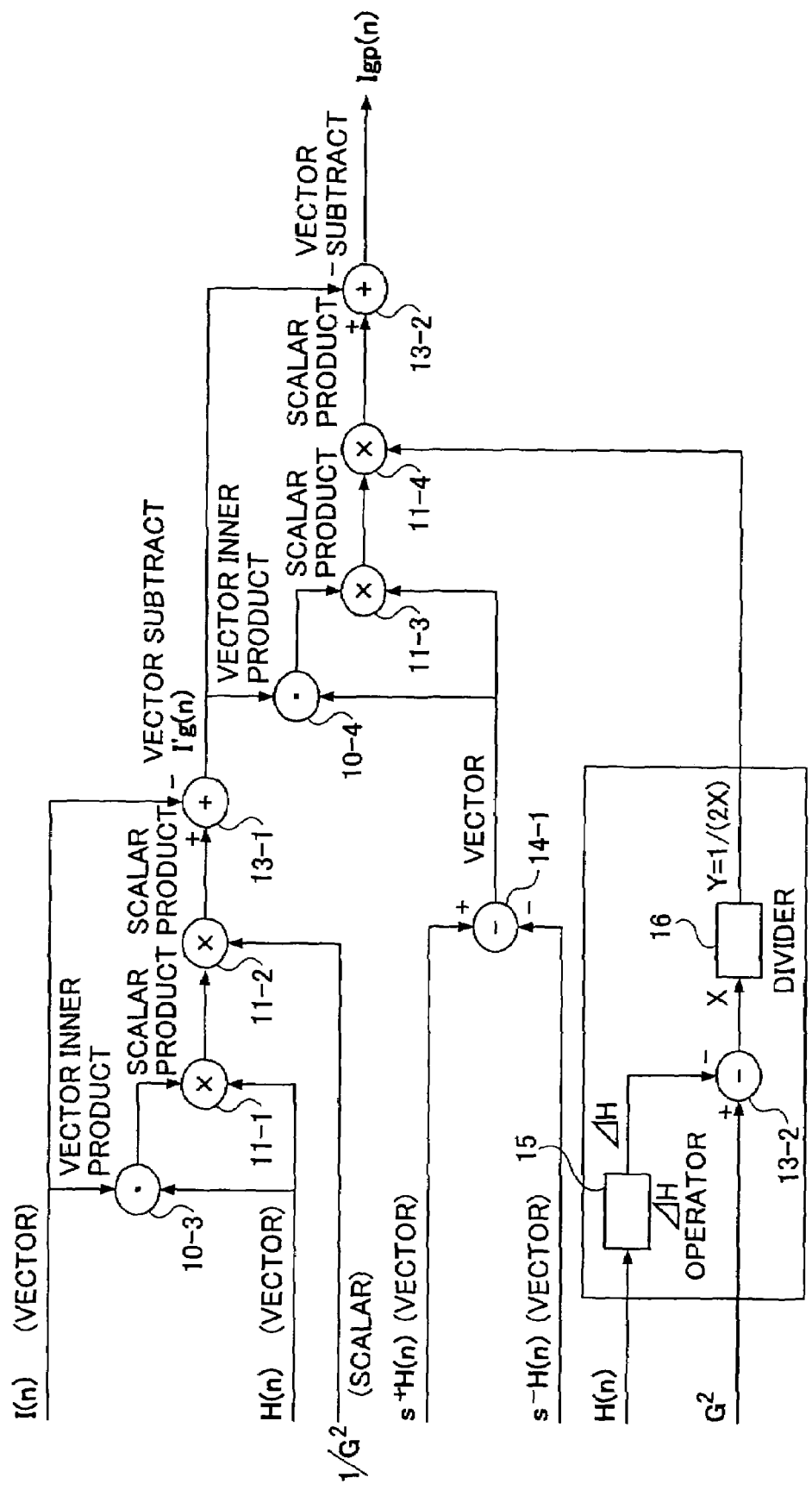
FIG. 16 shows a circuit diagram showing another embodiment of the restricting conditioning part 3.

FIG. 16 shows another example of a configuration of the above-mentioned restricting conditioning part 3. Generally, an operation cycle for a data bit length is needed for a division operation needed in case of obtaining the above-mentioned after-gain-and-phase-delay-amount-restricted coefficient updating vector Igp(n). Thereby, an operation delay amount occurs. The configuration shown in FIG. 16 effectively reduces the number of required dividers, so as to effectively reduce the operation delay amount.

Namely, the denominator of the second term of the above-mentioned formula (3') is transformed as below:

$$((s^+H(n) - s^-H(n)),$$
$$(s^+H(n) - s^-H(n))) = |s^+H(n)|^2 + |s^-H(n)|^2 - 2(s^+H(n), s^-H(n)))$$

-continued

In this case, $$s^+H(n)^2 = h_0^2 + h_1^2 + h_2^2 + h_3^2 + h_4^2 + h_5^2 + h_6^2 + h_7^2 + h_8^2$$
$$s^-H(n)^2 = h_1^2 + h_2^2 + h_3^2 + h_4^2 + h_5^2 + h_6^2 + h_7^2 + h_8^2 + h_9^2$$

In the equalizer in a hard disk drive, generally speaking, $h_0$ and $h_9$ which are the coefficient values of the respective filter taps at the both ends are small enough with respect to the coefficient values of the other central taps. Accordingly, the following approximation is possible:

$$|s^+H(n)|^2 = |s^-H(n)|^2 = |H(n)|^2$$

Moreover, a value ΔH is created as follows:

$$(s^+H(n), s^-H(n)) =$$
$$h_0h_2 + h_1h_3 + h_2h_4 + h_3h_5 + h_4h_6 + h_5h_7 + h_6h_8 + h_7h_9 = \Delta H$$

As a result, the following simplification is possible:

$$((s^+H(n) - s^-H(n)), (s^+H(n) - s^-H(n))) =$$
$$|s^+H(n)|^2 + |s^-H(n)|^2 - 2(s^+H(n), s^-H(n))) = 2|H(n)|^2 - 2\Delta H$$

In the last formula, the first term is a sum of squares, and, thus, does not change from a fixed value G as a result of the gain restricting. Accordingly, the denominator of the second term of the above-mentioned formula (3') is further simplified into the following formula:

$$2(G^2 - \Delta H)$$

Returning to FIG. 16, an inner product operator 10-3 and a scalar multiplier 11-1 correspond to the inner product operator 10-1 and the scalar multiplier 11 shown in FIG. 10, respectively, and, similar to the scalar divider 12 shown in FIG. 10, a scalar multiplier 11-2 divides ((H, I)×H) by $G^2$. As a result, the after-gain-restricted coefficient updating vector I'g(n) is obtained.

Figure 17:
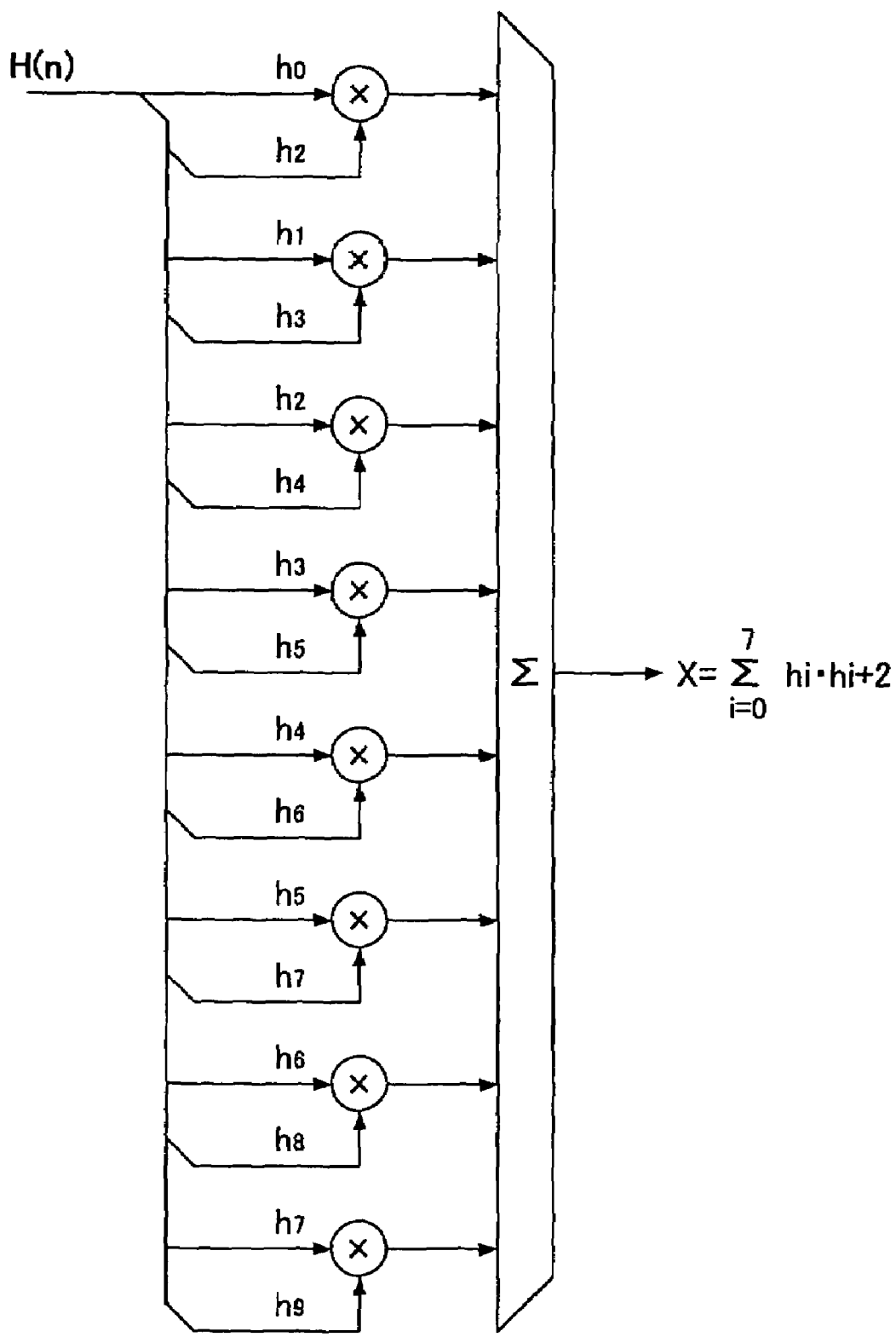
FIG. 17 shows a circuit diagram showing an internal configuration of a ΔH operation part shown in FIG. 16.

On the other hand, an adder 14-1 corresponds to the adder 14 shows in FIG. 11, and an inner product operator 10-4 corresponds to the inner product operator 10-1 in FIG. 11. Furthermore, a scalar multiplier 11-3 corresponds to the scalar multiplier 11 in FIG. 11. Moreover, a ΔH operator 15 has a configuration shown in FIG. 17, and calculates the above-mentioned value ΔH. The ΔH is then subtracted from G in a subtractor 13-2, and, thus, $(G^2 - \Delta H)$ is obtained.

The divider 16 obtains the denominator of the second term of the above-mentioned formula (3') by further dividing the reciprocal thereof by 2. Then, for this value, the second term of the formula (3') is acquired, by operation with a multiplier 11-4. Finally the operation of the formula (3') is completed with an adder 13-2, and thus, the coefficient updating vector Igp(n) after the gain restricting and phase delay amount restricting is obtained.

Thus, in the equalizer according to the embodiment of the present invention shown in FIG. 5, even with a relatively simple configuration, coefficient training for the equalizer body 1 with the FIR filter can be performed through a control of adjusting the frequency characteristics under the conditions that both the gain and phase delay amount in the equalizer body 1 are properly restricted simultaneously.

Further, the present invention is not limited to the above-described embodiments, and variations and modifications may be made without departing from the scope of the present invention.

The present application is based on Japanese priority application No. 2002-348790, filed on Nov. 29, 2002, the entire contents of which are hereby incorporated by reference.

What is claimed is:

1. A method of training for a recording medium reproduction equalizer, comprising, in a training operation for optimizing a multiplication coefficient for each tap of an FIR equalizer equalizing a read signal read from a recording medium, the steps of:
    a) utilizing, as a restricted coefficient updating vector applied for updating the multiplication coefficient for each tap of an FIR filter, a vector obtained from projecting, onto a plane perpendicular to a predetermined restricting conditioning vector, a coefficient updating vector determined based on an equalizer error between the output of the FIR equalizer and a reproduction output determined therefrom, and a delayed input value for each tap of the FIR equalizer; and
    b) utilizing, as the predetermined restricting conditioning vector, a coefficient vector comprising the multiplication coefficients for the equalizer obtained upon calculating the equalizer error.

2. A method of training for a recording medium reproduction equalizer, comprising, in a training operation for optimizing a multiplication coefficient for each tap of an FIR equalizer equalizing a read signal read from a recording medium, the steps of:
    a) utilizing, as a restricted coefficient updating vector applied for updating the multiplication coefficient for each tap of an FIR filter, a vector obtained by projecting, onto a plane perpendicular to a predetermined restricting conditioning vector, a coefficient updating vector determined based on an equalizer error between the output of the FIR equalizer and a reproduction output determined therefrom, and a delayed input value for each tap of the FIR equalizer; and
    b) utilizing, as the predetermined restricting conditioning vector, a vector which is a difference between a coefficient vector comprising the multiplication coefficients for the FIR equalizer obtained upon calculating the equalizer error and another coefficient vector immediately subsequent thereto obtained in a same condition.

3. The method as claimed in claim 2, wherein:
said coefficient vector immediately subsequent comprises the multiplication coefficients shifted toward a higher order side by one order with respect to those of a current coefficient vector and a predetermined number inserted as a lowest order coefficient.

4. The method as claimed in claim 3, wherein:
said predetermined number comprises zero.

5. A method of training for a recording medium reproduction equalizer, comprising, in a training operation for optimizing a multiplication coefficient for each tap of an FIR equalizer equalizing a read signal read from a recording medium, the steps of:
    a) utilizing, as a restricted coefficient updating vector applied for updating the multiplication coefficient for each tap of an FIR filter, a vector obtained by projecting, onto a plane perpendicular to a predetermined restricting conditioning vector, a coefficient updating vector determined based on an equalizer error between an output of the FIR equalizer and a reproduction output determined therefrom and a delayed input value for each tap of the FIR equalizer; and
    b) utilizing, as the predetermined restricting conditioning vector, a vector which is a difference between a subsequent coefficient vector obtained in the same condition immediately subsequent to and an antecedent coefficient vector obtained in the same condition immediately antecedent to a reference coefficient comprising the multiplication coefficients for the FIR equalizer obtained upon calculating the equalizer error.

6. The method as claimed in claim 5, wherein:
said coefficient vector immediately subsequent comprises the multiplication coefficients shifted toward a higher order side by one order with respect to those of the reference coefficient vector and a first predetermined number inserted as a lowest order coefficient; and
said coefficient vector immediately antecedent comprises the multiplication coefficients shifted toward a lower order side by one order with respect to those of the reference coefficient vector and a second predetermined number inserted as the highest order coefficient.

7. The method as claimed in claim 6, wherein:
said first predetermined number comprises zero, and said second predetermined number also comprises zero.

8. A recording medium reproduction apparatus comprising:
training part training for a recording medium reproduction equalizer,
wherein:
in a training operation for optimizing a multiplication coefficient for each tap of an FIR equalizer equalizing a read signal read from a recording medium, said training part utilizes, as a restricted coefficient updating vector applied for updating the multiplication coefficient for each tap of an FIR filter, a vector obtained by projecting, onto a plane perpendicular to a predetermined restricting conditioning vector, a coefficient updating vector determined based on an equalizer error between the output of the FIR equalizer and a reproduction output determined therefrom and a delayed input value for each tap of the FIR equalizer; and
said training part utilizes, as the predetermined restricting conditioning vector, a coefficient vector comprising the multiplication coefficients for the FIR equalizer obtained upon calculating the equalizer error.

9. A recording medium reproduction apparatus comprising:
training part training for a recording medium reproduction equalizer,
wherein:
in a training operation for optimizing a multiplication coefficient for each tap of an FIR equalizer equalizing a read signal read from a recording medium, said training part utilizes, as a restricted coefficient updating vector applied for updating the multiplication coefficient for each tap of an FIR filter, a vector obtained by projecting, onto a plane perpendicular to a predetermined restricting conditioning vector, a coefficient updating vector determined based on an equalizer error between the output of the FIR equalizer and a reproduction output determined therefrom and a delayed input value for each tap of the FIR equalizer; and
said training part utilizes, as the predetermined restricting conditioning vector, a vector which is a difference between a coefficient vector comprising the multiplication coefficients for the FIR equalizer obtained upon calculating the equalizer error and another coefficient vector immediately subsequent thereto obtained in the same condition.

10. The apparatus as claimed in claim 9, wherein:

said coefficient vector immediately subsequent comprises the multiplication coefficients shifted toward a higher order side by one order with respect to those of the current coefficient vector and a predetermined number inserted as a lowest order coefficient.

11. The apparatus as claimed in claim 10, wherein:

said predetermined number comprises zero.

12. A recording medium reproduction apparatus comprising:

training part training for a recording medium reproduction equalizer, wherein:

in a training operation for optimizing a multiplication coefficient for each tap of an FIR equalizer equalizing a read signal read from a recording medium, said training part utilizes, as a restricted coefficient updating vector applied for updating the multiplication coefficient for each tap of an FIR filter, a vector obtained by projecting, onto a plane perpendicular to a predetermined restricting conditioning vector, a coefficient updating vector determined based on an equalizer error between the output of the FIR equalizer and a reproduction output determined therefrom and a delayed input value for each tap of the FIR equalizer; and said training part utilizes, as the restricting conditioning vector, a vector which is a difference between a subsequent coefficient vector obtained in the same condition immediately subsequent to and an antecedent coefficient vector obtained in the same condition immediately antecedent to a reference coefficient comprising the multiplication coefficients for the FIR equalizer obtained upon calculating the equalizer error.

13. The apparatus as claimed in claim 12, wherein:

said coefficient vector immediately subsequent comprises the multiplication coefficients shifted toward a higher order side by one order with respect to those of the reference coefficient vector and a first predetermined number inserted as a lowest order coefficient; and said coefficient vector immediately antecedent comprises the multiplication coefficients shifted toward the lower order side by one order with respect to those of the reference coefficient vector and a second predetermined number inserted as a highest order coefficient.

14. The apparatus as claimed in claim 13, wherein:

said first predetermined number comprises zero, and said second predetermined number also comprises zero.

* * * * *